US012720267B2

(12) United States Patent
Cook

(10) Patent No.: US 12,720,267 B2
(45) Date of Patent: Aug. 25, 2026

(54) AUDIO CONFIGURATION

(71) Applicant: Sky CP Limited, Isleworth (GB)

(72) Inventor: Alec Cook, Isleworth (GB)

(73) Assignee: Sky CP Limited, Isleworth (GB)

( * ) Notice: Subject to any disclaimer, the term of this patent is extended or adjusted under 35 U.S.C. 154(b) by 159 days.

(21) Appl. No.: 18/569,011

(22) PCT Filed: Jun. 10, 2022

(86) PCT No.: PCT/GB2022/051467
§ 371 (c)(1),
(2) Date: Dec. 11, 2023

(87) PCT Pub. No.: WO2022/258990
PCT Pub. Date: Dec. 15, 2022

(65) Prior Publication Data

US 2024/0284133 A1 Aug. 22, 2024

(30) Foreign Application Priority Data

Jun. 11, 2021 (GB) ..................................... 2108381

(51) Int. Cl.
*H04S 7/00* (2006.01)
*H04R 5/02* (2006.01)
(Continued)

(52) U.S. Cl.
CPC ............... *H04S 7/301* (2013.01); *H04R 5/02* (2013.01); *H04R 5/04* (2013.01); *H04S 3/008* (2013.01);
(Continued)

(58) Field of Classification Search
CPC . H04S 7/00; H04S 7/301; H04S 3/008; H04R 5/02; H04R 5/04; H04R 2420/07; H04R 2205/024
See application file for complete search history.

(56) References Cited

U.S. PATENT DOCUMENTS 10,158,946 B2 12/2018 Hammer et al.
10,263,668 B2 4/2019 Li et al.
(Continued)

FOREIGN PATENT DOCUMENTS

CN 110621065 A 12/2019
EP 3282716 A1 2/2018
(Continued)

OTHER PUBLICATIONS

International Search Report and Written Opinion dated Aug. 2, 2022, in connection with Int'l App. No. PCT/GB2022/051467 (13 pages).

(Continued)

*Primary Examiner* — David L Ton
(74) *Attorney, Agent, or Firm* — McCarter & English, LLP

(57) ABSTRACT

A TV audio system comprises a TV (10), at least one wireless surround sound speaker (20), and at least one a wireless network node (16, 22). The relative position of the speaker (20) to the TV (10), or to one or more viewers of the TV (10), is detecting from a state of a physical wireless channel by means of the wireless network node(s). Based on the detected relative position, at least one corresponding surround sound channel is selected for wireless output to the speaker (20).

13 Claims, 4 Drawing Sheets

(51) Int. Cl.
*H04R 5/04* (2006.01)
*H04S 3/00* (2006.01)

(52) U.S. Cl.
CPC .... *H04R 2205/024* (2013.01); *H04R 2420/07* (2013.01); *H04S 2400/01* (2013.01)

(56) References Cited

U.S. PATENT DOCUMENTS

| | | | |
|---|---|---|---|
| 10,649,722 B2 | 5/2020 | Yu et al. | |
| 2013/0024018 A1 | 1/2013 | Chang et al. | |
| 2013/0324031 A1 | 12/2013 | Loureiro | |
| 2019/0253801 A1 | 8/2019 | Arteaga et al. | |
| 2021/0127288 A1* | 4/2021 | Manolakos | H04W 64/003 |

FOREIGN PATENT DOCUMENTS

| | | |
|---|---|---|
| JP | 2009089076 A | 4/2009 |
| KR | 102245469 B1 | 4/2021 |

OTHER PUBLICATIONS

Combined Search and Examination Report dated Mar. 31, 2022, in connection with UK Application No. GB2108381.1 (9 pages).
Examination Report dated Jan. 13, 2023, in connection with UK Application No. GB2108381.1 (3 pages).
Examination Report dated Mar. 31, 2023, in connection with UK Application No. GB2108381.1 (3 pages).
International Search Report of the International Searching Authority mailed on Aug. 2, 2022, issued in connection with International Application No. PCT/GB2022/051467 (5 pages).
Written Opinion of the International Searching Authority mailed on Aug. 2, 2022, issued in connection with International Application No. PCT/GB2022/051467 (7 pages).
Communication Pursuant to Article 94(3) EPC dated Nov. 25, 2025, issued by the European Patent Office in connection with European Application No. EP22731782.3 (6 pages).

* cited by examiner

AUDIO CONFIGURATION

RELATED APPLICATIONS

The present application is a U.S. National Phase Application under 35 U.S.C. § 371 of International Application No. PCT/GB2022/051467 filed on Jun. 10, 2022, which claims the benefit of United Kingdom Patent Application No. GB2108381.1 filed on Jun. 11, 2021, the entire disclosures of which are expressly incorporated by reference herein.

FIELD OF THE INVENTION

The present invention relates to a TV audio system for achieving a surround sound effect, and a method of configuring that system.

BACKGROUND

Conventional surround sound systems require an array of speakers to be set up around the listening area; for example 5.1 surround sound requires centre, front/rear left/right and subwoofer speakers. However, the configuration of such speaker arrays is complex and requires careful positioning and calibration. For example, one commonly used calibration technique involves setting up a microphone at the listening/viewing position, and playing a series of audio signals through the different speakers to determine which speakers are connected and their appropriate phase and volume settings.

An alternative technique commonly used in TV audio systems is to use an array of speakers in a single location e.g. in a soundbar, to generate a surround sound effect using virtual speakers. This has the advantage of being simple to set up, but the effect is generally less impressive than using multiple speakers in different positions.

US-A-2013/0024018 discloses using the detected position of a user's mobile device to set up a surround sound system.

JP-A-2009089076 discloses using millimetre wave radar to detect the position of speakers in surround sound system.

SUMMARY OF THE INVENTION

In one aspect of the invention, there is provided a method of configuring a TV audio system comprising a TV apparatus including a TV display panel, at least one wireless surround sound speaker, and at least one wireless network node. The relative position of the speaker to the TV apparatus, or to one or more viewers of the TV apparatus, is detecting using wireless signals emitted and received by the wireless network node, in particular by monitoring the physical channel state of the wireless signals to detect the position of the speaker, TV apparatus and/or viewer(s), and/or motion of the viewers e.g. WiFi sensing or WLAN sensing. Based on the detected relative position, at least one corresponding surround sound channel is selected for wireless output to the speaker.

An advantage of this method is that TV apparatus such as a smart TV or set-top box typically includes a wireless network node in order to receive Internet protocol (IP) streamed content. In this method, the wireless network node is used to provide an additional function of detecting the relative position of the speaker, for example using Wi-Fi sensing technology that may be provided by processing signals received by the wireless network node.

The at least one wireless network node may be integrated in at least one of the TV apparatus and the speaker. Advantageously, the position of the wireless network node is thereby equivalent to the position of the TV apparatus or speaker, which facilitates detection of the relative position of the speaker or TV apparatus.

More than one corresponding surround sound channel may be selected for supply to the speaker, for example if the detected relative position is intermediate two or more positions, each corresponding to a respective surround sound channel. For example, if the speaker is located immediately behind the viewer and in front of the display channel, left rear and right rear surround sound channels may be supplied to the speaker. The surround sound channels may be mixed before transmission to the wireless speaker, so that only one channel need be provided to the speaker.

The distance of the speaker from the TV display panel, or from one or more viewers of the TV display panel, may be detected using signals emitted and received by the wireless network client. Based on the detected distance, a volume level or gain may be determined for the speaker and used to control the volume level of the speaker so that a balanced surround sound effect is achieved.

The orientation of the speaker may be detected, and a surround sound channel such as a height channel may be selected for output by the speaker based on the detected orientation.

Advantageously, configuration of the wireless surround sound speaker is simplified by the above methods.

BRIEF DESCRIPTION OF THE DRAWINGS

Specific embodiments of the present invention will now be described with reference to the accompanying drawings, in which.

DETAILED DESCRIPTION OF EMBODIMENTS

Figure 1:
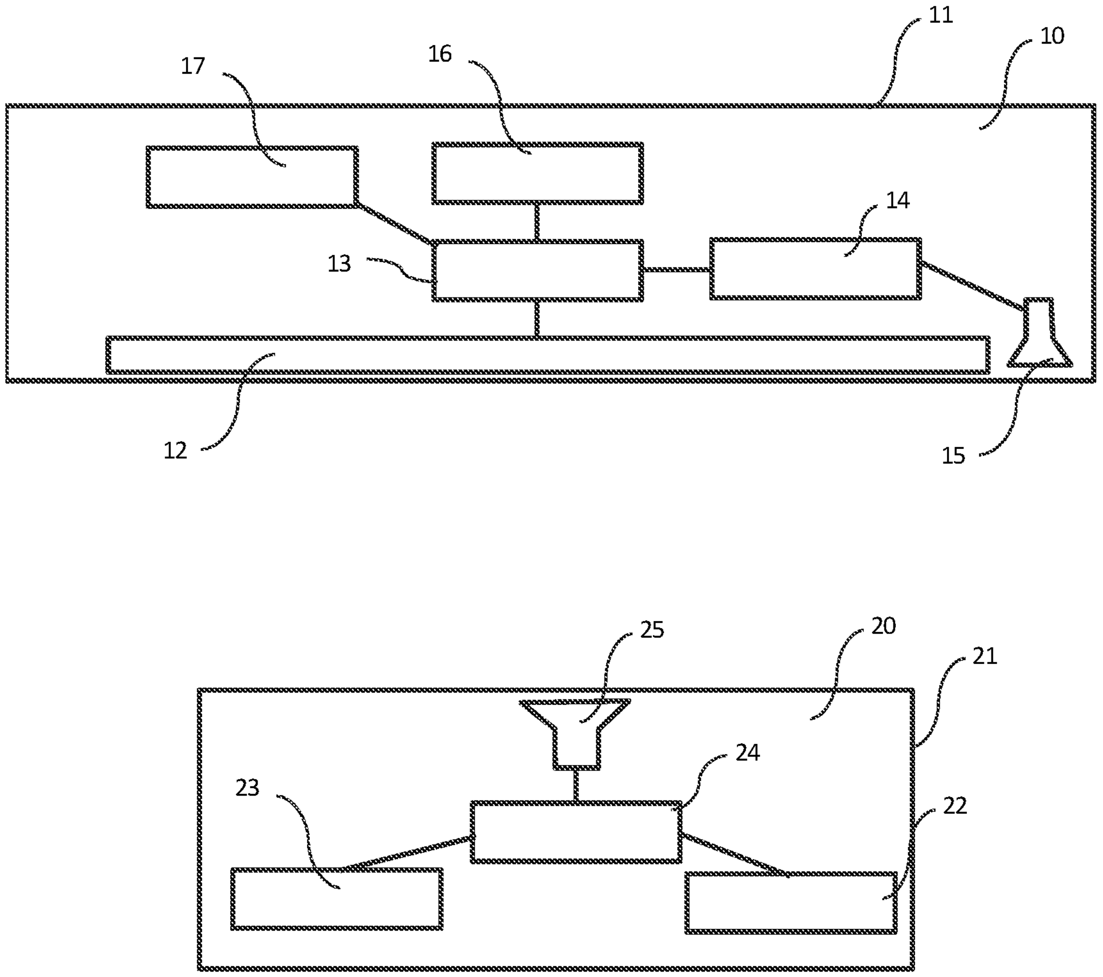
FIG. 1 is schematic diagram of a TV audio system in an embodiment of the invention.

FIGS. 1-5 illustrate a method of configuring a TV audio system in an embodiment of the invention. As shown in FIG. 1, the TV audio system comprises a television (TV) 10 and a wireless surround sound speaker 20. The TV 10 comprises, preferably integrated within a housing 11, a TV display panel 12, a TV processor 13, an audio processor 14, one or more audio speakers 15 (in this case, stereo left and right speakers), a wireless network (e.g. Wi-Fi) node 16 and a Bluetooth® interface 17.

The wireless surround sound speaker 20 comprises, preferably integrated within a housing 21, a wireless network (e.g. Wi-Fi) node 22, a Bluetooth® interface 23, an audio processor 24 and at least one audio speaker 25. The wireless surround sound speaker 20 is preferably battery powered, so as not to be constrained by the location of a mains outlet. The speaker 20 may also have a conventional Bluetooth speaker mode, for use away from the TV 10.

The TV 10 receives audio-visual content as internet protocol (IP) streams via a broadband connection to the wireless AP 16. Additionally or alternatively, the TV 10 may receive audio-visual content via one or more broadcast receivers, such as terrestrial and/or satellite TV tuners. The audio-visual content is output to the visual display panel 12 and the audio speakers 15, under the control of the TV processor 13 which may also generate a user interface (UI) on the TV display panel 12 allowing control of the operation of the TV 10 via a remote control (not shown).

The audio processor 14 within the TV 10 decodes surround sound channels provided within the audio-visual content. For example, the audio processor may comprise a Dolby® MS12 decoder configured to decode and output all available audio streams.

Other features of the TV 10 that may be necessary for a particular implementation, such as amplifiers, display drivers, batteries, mains power supply, user interface etc. are omitted for conciseness.

The surround sound speaker 20 is wirelessly connected to the TV 10 via the Bluetooth® interfaces 17, 23 so that one or more audio channels are output from the TV 10 to the wireless surround sound speaker 20 for output to the at least one audio speaker 25, under the control of the audio processor 24. Additionally or alternatively, the speaker 20 may be connected to the TV 10 via the Wi-Fi nodes 16, 22, for example to relay status information and control signals.

A method of configuring the TV audio system will now be described with reference to FIG. 4. The method may be performed by the TV processor 13 executing program code stored in memory within the TV 10 e.g. as software or firmware.

Figure 4:
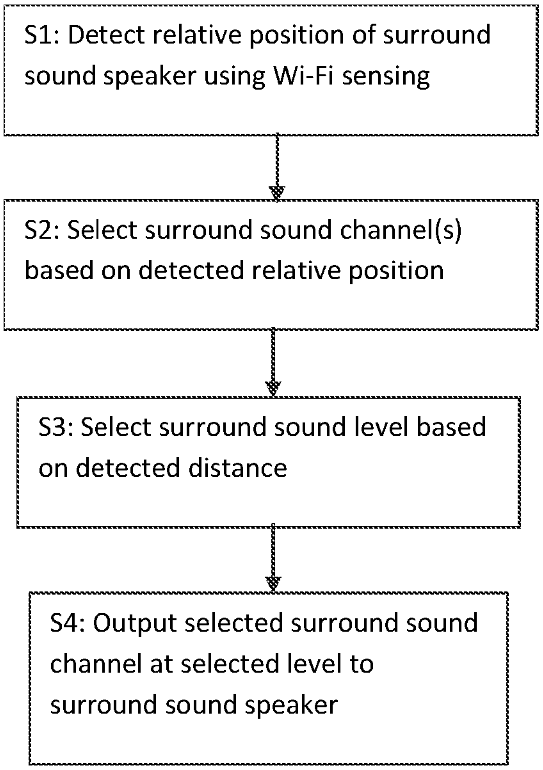
FIG. 4 is a flowchart illustrating a method of configuring the TV audio system.

The position of the surround sound speaker 20 relative to the TV 10 is detected by means of Wi-Fi or WLAN sensing i.e. by monitoring or sensing the state of the physical wireless channel at or between the wireless nodes 16, 22, the state being influenced by the position of the surround sound speaker 20 and/or the TV 10; see step S1 in FIG. 4.

Additionally, the position of one or more viewers relative to the TV 10 may be detected by means of Wi-Fi/WLAN sensing, for example using Wi-Fi motion sensing. Alternatively, the position of the one or more viewers may be inferred from the position and/or orientation of the TV 10: for example, the one or more viewers may be assumed to be in front of the TV 10 (i.e. facing the visual display panel 12), at an optimum viewing distance from the TV 10 given the size of the visual display panel 12, such as 1.6 times the diagonal size of the visual display panel 12; alternatively, the preferred distance of the one or more viewers from the TV 10 may be set manually, for example by means of the user interface of the TV 10.

The Wi-Fi sensing functionality may be implemented using standard (e.g. 802.11) Wi-Fi nodes, with additional processing of physical layer channel state information in order to derive the positions of objects interfering with the channels between the Wi-Fi nodes 16, 22. The functionality may be implemented on a DSP (Digital Signal Processor) or System on a Chip (SoC), such as the R10 chip developed by Cognitive Systems Corp.

The output of the Wi-Fi sensing functionality may be analysed to identify the location of the TV 10. As the TV 10 has a known shape and size and preferably includes a metal backplate, the position and orientation of the TV 10 can be deduced from the output of the Wi-Fi sensing functionality, referenced to the wireless node 22 within the surround sound speaker 20. The size of the TV 10 may be pre-programmed into or communicated to the speaker 20, either through the Bluetooth® or Wi-Fi connection. Alternatively, the characteristic shape of the TV 10 may be detected without the need to know its size.

The output of the Wi-Fi sensing functionality may be analysed to identify the location of the speaker 20. As the speaker 20 has a known shape and size, the position of the speaker 20 can be deduced from the output of the Wi-Fi sensing functionality, referenced to the wireless node 16 within the TV 10.

The detection of the relative position of the TV 10 and the speaker 20 may be augmented by detecting the phase of the ARP (Address Resolution Protocol) or SSID (Service Set Identifier) signals from the wireless node 16 at the wireless node 22.

Figure 2:
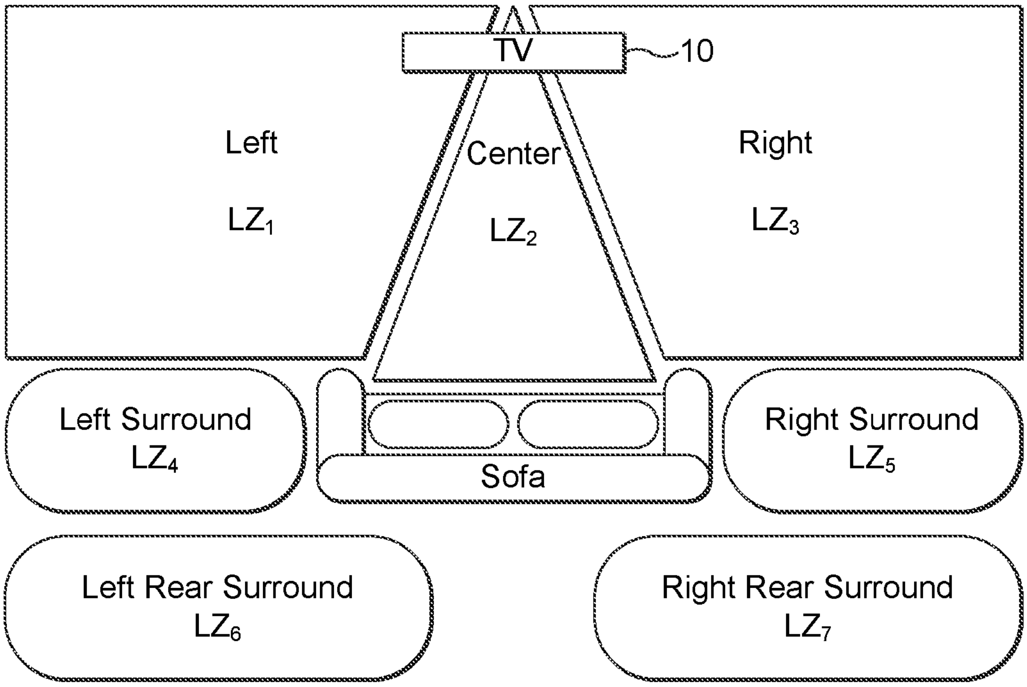
FIG. 2 is a diagram illustrating surround sound zones in the TV audio system.

The one or more audio channels to be output from the TV 10 to the wireless surround sound speaker 20 are selected based on the relative location of the surround sound speaker 20 (step S2 in FIG. 4), for example as shown in FIG. 2 which shows relative location zones $LZ_1$-$LZ_7$ and the corresponding surround sound channel that is provided to the wireless surround sound speaker 20 depending on the location zone LZ in which it is located. In this case there are 7 location zones $LZ_1$-$LZ_7$ corresponding to 7.1 surround sound: left, centre, right, left surround, right surround, left rear surround and right rear surround. The additional low frequency channel(s) typically do not require accurate positioning of speakers, such as a subwoofer. The relative location zones LZ may be defined by data accessed by the TV processor 13 when executing the method.

In a situation where the surround sound speaker 20 is detected to be positioned between two or more relative location zones LZ, the audio processor 14 may mix the corresponding surround sound channels with relative levels corresponding to the relative proximity of the surround sound speaker 20 to the relative location zones LZ, and provide the mixed channel as a single channel to the surround sound speaker 20 for output (step S4 in FIG. 4). For example, if the surround sound speaker 20 is located between the left rear surround and right rear surround location zones $LZ_6$, $LZ_7$ the audio processor may provide a mix of the left rear surround and right rear surround channels.

In some applications, the left and right channels may be output by the audio speakers 15 integrated within the TV 10. In that case, the left and right channels may not be selected for output to the surround sound speaker 20.

Figure 3:
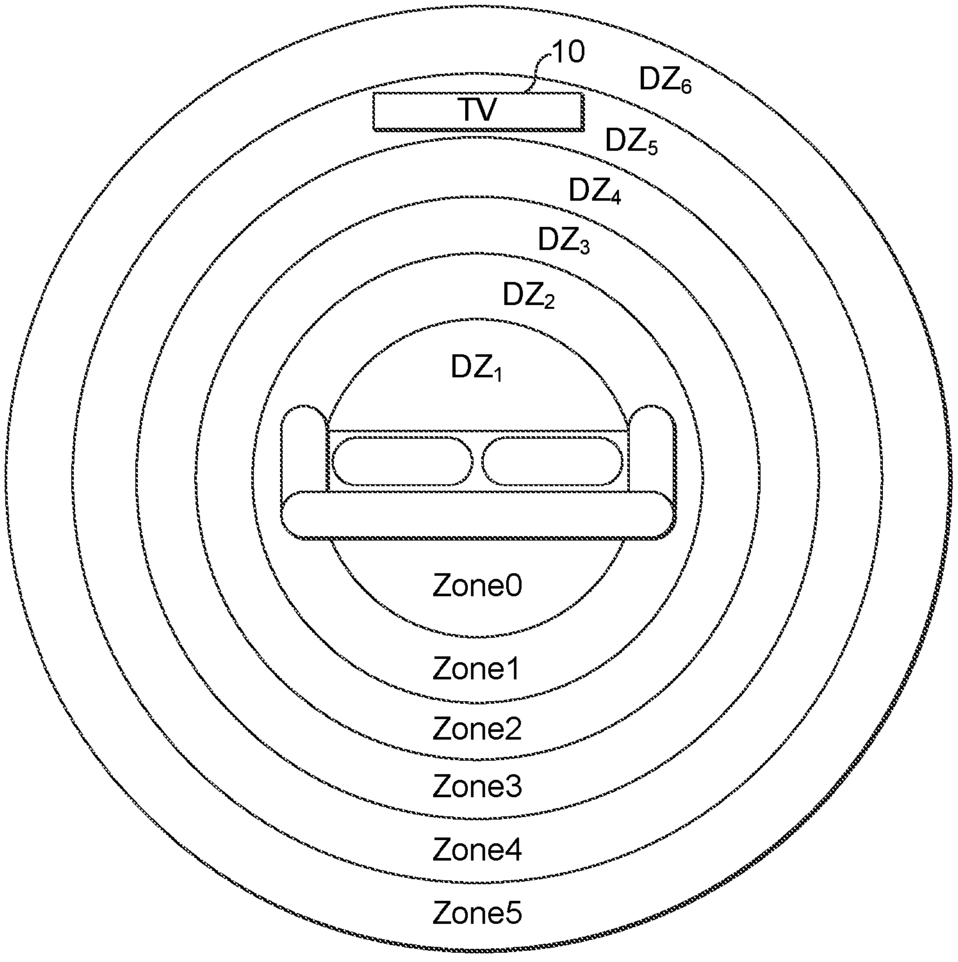
FIG. 3 is a diagram illustrating volume zones in the TV audio system.

Preferably, the volume level of the surround sound speaker 20 is selected according to its distance from the one or more viewers (step S3 in FIG. 4). For example as shown in FIG. 3, the distance may be divided into a plurality of concentric radial distance zones $DZ_1$-$DZ_6$ and the sound level selected according to the distance zone DZ in which the surround sound speaker 20 lies. The distance zones DZ may be defined by data accessed by the TV processor 13 when executing the method.

More than one surround sound speaker 20 may be connected concurrently to the TV 10 and positioned in different locations around the one or more viewers so as to provide an enhanced surround sound effect. However, it is envisaged that embodiments of the invention may be used to provide a simple form of surround sound without requiring precise positioning and calibration of the surround sound speakers 20.

The speaker 20 may also be positioned on its back for use as an up-firing speaker, or supported pointing downwards for use as a downward-firing speaker, for example playing a Dolby Atmos® height channel. The orientation of the speaker 20 may be detected using a gravitational sensor within the speaker 20 and signalled to the TV 10, for example via the Wi-Fi connection.

Figure 5:
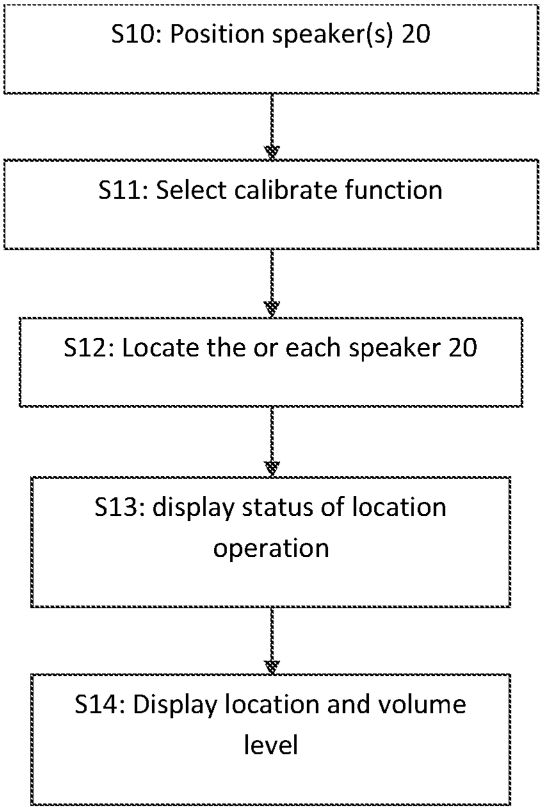
FIG. 5 is flowchart illustrating a method of user interaction when configuring the TV audio system.

One example of a method of use of the TV audio system by a user will now be described with reference to the steps shown in FIG. 5:

S10. The user places speaker 20 is a desired location, for example based on convenience and/or the desired surround sound effect S11. Via the UI of the TV 10, the user selects a 'Calibrate' function for the surround sound speaker(s)

S12. For the or each speaker 20, a 'position location' operation is performed by the TV processor 13 (e.g. as in steps S1-S3).

S13. The status of each operation is displayed to the user on the UI (e.g. Calibration Successful/Calibration Failed). The reason for failure may also be displayed, e.g.:

Wi-Fi signal not strong enough to get position location

Bluetooth signal not strong enough to adequately stream audio data

TV cannot be located

S14. If the or all speaker(s) 20 are located, the UI displays a graphic that shows how the located speakers are positioned and asks the user to confirm the configuration. Optionally, the TV processor may determine optimum positions for the located speaker(s) 20 and prompt the user to move the speaker(s) that are not in an optimum position. The UI may also show the volume level selected for the or each speaker 20, for example as set in step S3. This level may be adjusted by the user, via the UI.

In an alternative or additional mode of use that may be selected via the UI, the speaker 20 may be positioned close to a viewer who is hard of hearing. The volume level may be set louder that the initial surround sound setting, so that the viewer can hear the TV audio better without having to turn the overall audio volume level so high as to inconvenience other viewers.

The invention claimed is:

1. A method of configuring a TV audio system comprising a TV apparatus including a TV display, at least one discrete wireless speaker, and at least one node of a wireless network, the method comprising:

a. detecting a position of the speaker relative to the TV apparatus, or to one or more viewers of the TV apparatus, from a physical layer wireless channel state of the wireless network by means of the at least one wireless network node, and b. selecting, according to said detected position, at least one surround sound channel for output by the speaker, wherein a distance of the speaker from the TV apparatus or from one or more viewers of the TV apparatus is detected from the physical layer wireless channel state by means of the wireless network node or nodes, and a gain of the channel or channels output by the speaker is selected according to the detected distance.

2. Method of claim 1, wherein the position of the speaker is detected relative to a plurality of location zones, and the at least one surround sound channel is selected corresponding to one or more of the location zones in or near which the speaker is positioned.

3. Method of claim 2, wherein the speaker is detected to be positioned near a plurality of location zones and a corresponding plurality of surround sound channels is mixed for output by the speaker.

4. Method of claim 1, wherein the distance is defined relative to a plurality of predefined distance zones.

5. Method of claim 1, wherein the position of the speaker relative to the one or more viewers is detected from the physical layer wireless channel state by means of the wireless network node or nodes.

6. Method of claim 1, wherein the position of the speaker relative to the one or more viewers is determined by detecting the position of the speaker relative to the TV apparatus from the physical layer wireless channel state by means of the wireless network node or nodes, and assuming a relative position of the one or more viewers relative to the TV apparatus.

7. Method of claim 1, wherein at least one said wireless network node is integrated within the TV apparatus and the position of the speaker or the one or more viewers is detected relative to the TV apparatus.

8. Method of claim 1, wherein at least one said wireless network node is integrated within the speaker and the position of the TV apparatus or the one or more viewers is detected relative to the speaker.

9. Method of claim 1, wherein the wireless speaker is connected to the wireless network.

10. Method of claim 1, wherein the wireless speaker is connected wirelessly to the TV apparatus.

11. A method of configuring a TV audio system comprising a TV apparatus including a TV display, at least one discrete wireless speaker, and at least one node of a wireless network, the method comprising:

a. detecting a position of the speaker relative to the TV apparatus, or to one or more viewers of the TV apparatus, from a physical layer wireless channel state of the wireless network by means of the at least one wireless network node;

b. detecting an orientation of the speaker; and c. selecting, according to said detected position and orientation, at least one surround sound channel for output by the speaker.

12. A TV audio system comprising a TV apparatus including a TV display, at least one discrete wireless speaker, and at least one node of a wireless network, wherein the system includes at least one processor arranged to:

detect a position of the speaker relative to the TV apparatus, or to one or more viewers of the TV apparatus, from a state of a physical layer wireless channel of the wireless network by means of the at least one wireless network node, and select, according to said detected position, at least one surround sound channel for output by the speaker, wherein a distance of the speaker from the TV apparatus or from one or more viewers of the TV apparatus is detected from the physical layer wireless channel state by means of the wireless network node or nodes, and a gain of the channel or channels output by the speaker is selected according to the detected distance.

13. A non-transitory computer program product comprising program code executed by a processor to perform the following steps in a system comprising a TV apparatus including a TV display, at least one discrete wireless speaker, and at least one node of a wireless network:

detect a position of the speaker relative to the TV apparatus, or to one or more viewers of the TV apparatus, from a state of a physical layer wireless channel of the wireless network by means of the at least one wireless network node, and select, according to said detected position, at least one surround sound channel for output by the speaker, wherein a distance of the speaker from the TV apparatus or from one or more viewers of the TV apparatus is detected from the physical layer wireless channel state by means of the wireless network node or nodes, and a gain of the channel or channels output by the speaker is selected according to the detected distance.

* * * * *